United States Patent
Larsen et al.

(10) Patent No.: US 11,499,523 B2
(45) Date of Patent: Nov. 15, 2022

(54) WIND TURBINE BLADES AND MANUFACTURING SYSTEMS AND METHODS USING SEGMENTED BLADE ASSEMBLY

(71) Applicant: Vestas Wind Systems A/S, Aarhus N. (DK)

(72) Inventors: Gerner Larsen, Hinnerup (DK); Allan Hjarbæk Holm, Langå (DK); Julio Xavier Vianna Neto, Århus N (DK); Abdalla Khamas, Århus N (DK); Miguel Fernandez Perez, Lyngby (DK)

(73) Assignee: Vestas Wind Systems A/S, Aarhus N (DK)

( * ) Notice: Subject to any disclaimer, the term of this patent is extended or adjusted under 35 U.S.C. 154(b) by 113 days.

(21) Appl. No.: 16/956,027

(22) PCT Filed: Dec. 13, 2018

(86) PCT No.: PCT/DK2018/050360
§ 371 (c)(1),
(2) Date: Jun. 19, 2020

(87) PCT Pub. No.: WO2019/120412
PCT Pub. Date: Jun. 27, 2019

(65) Prior Publication Data
US 2021/0088025 A1    Mar. 25, 2021

(30) Foreign Application Priority Data
Dec. 20, 2017   (GB) ..................................... 1721419

(51) Int. Cl.
*F03D 1/06*       (2006.01)
*B23P 15/02*      (2006.01)
(Continued)

(52) U.S. Cl.
CPC ............ *F03D 1/0675* (2013.01); *B23P 15/02* (2013.01); *B23P 15/04* (2013.01);
(Continued)

(58) Field of Classification Search
CPC .... F03D 1/0675; F03D 1/0683; F03D 1/0633; F03D 1/065; F03D 1/0641; F03D 1/0658;
(Continued)

(56) References Cited

U.S. PATENT DOCUMENTS 7,393,184 B2    7/2008   Cairo
7,854,594 B2    12/2010  Judge
(Continued)

FOREIGN PATENT DOCUMENTS

CN     102200100 A      9/2011
EP      2246558 A2     11/2010
(Continued)

OTHER PUBLICATIONS

Intellectual Property Office, Search and Examination Report in GB1721419.8, dated Jun. 6, 2018.
(Continued)

*Primary Examiner* — Eric J Zamora Alvarez
(74) *Attorney, Agent, or Firm* — Wood Herron & Evans LLP

(57) ABSTRACT

A system (24) and method are described herein for manufacturing a wind turbine blade (22) proximate to the final installation site of a wind turbine (10). The system (24) includes a creel (72) of feeders (74) configured to apply strengthening elements (62) onto a plurality of shell core sections (26) coupled together and fed through the creel (72). The shell core sections (26) include an external surface (56) with a plurality of external grooves (58) recessed into the external surface (56) such that the strengthening elements (62) are laid into the external grooves (58). The
(Continued)

system (24) also includes a deposition station (78) configured to apply an outer surface material layer (82) in fluid form to cover the external surface (56) and the plurality of strengthening elements (62). A curing station (86) heats and consolidates the shell core sections (26), the strengthening elements (62), and the outer surface material layer (82) together into a final consolidated part, with the outer surface material layer (82) defining an external profile of the blade (22) following curing.

13 Claims, 8 Drawing Sheets

(51) Int. Cl.
 *B23P 15/04* (2006.01)
 *B29D 99/00* (2010.01)
 *B33Y 10/00* (2015.01)
 *B33Y 80/00* (2015.01)
 *B33Y 30/00* (2015.01)

(52) U.S. Cl.
 CPC .......... *B29D 99/0028* (2013.01); *B33Y 80/00* (2014.12); *B33Y 10/00* (2014.12); *B33Y 30/00* (2014.12); *F05B 2230/20* (2013.01); *F05B 2230/30* (2013.01); *F05B 2240/302* (2013.01); *Y10T 29/49339* (2015.01)

(58) Field of Classification Search
 CPC .......... F03D 13/20; F03D 80/00; F03B 3/121; F01D 5/147; B33Y 80/00; B33Y 10/00; B33Y 30/00; B29D 99/0028; F05B 2230/20; F05B 2230/30; F05B 2240/302; F05B 2280/6003; F05B 2230/604; F05D 2240/30; Y10T 29/49337; Y10T 29/49339
 See application file for complete search history.

(56) References Cited

U.S. PATENT DOCUMENTS

| | | | |
|---|---|---|---|
| 9,169,732 | B1 | 10/2015 | Braley et al. |
| 9,283,726 | B2 * | 3/2016 | Obrecht ................ B29C 70/546 |
| 2011/0091326 | A1 * | 4/2011 | Hancock ............... F03D 1/0683 |
| | | | 29/889.7 |
| 2011/0123343 | A1 | 5/2011 | Ronner |
| 2012/0027608 | A1 | 2/2012 | Martinez |
| 2012/0156049 | A1 * | 6/2012 | Hong .................... F04D 29/322 |
| | | | 416/241 A |
| 2013/0295338 | A1 | 11/2013 | Keating et al. |
| 2016/0215762 | A1 * | 7/2016 | Rohden ................... E04C 5/162 |
| 2016/0281680 | A1 * | 9/2016 | Randall ................ F03D 1/0675 |
| 2018/0223794 | A1 * | 8/2018 | Tobin ................. B29D 99/0028 |

FOREIGN PATENT DOCUMENTS

| | | |
|---|---|---|
| GB | 2520007 A | 5/2015 |
| WO | 0146582 A2 | 6/2001 |
| WO | 2005064156 A1 | 7/2005 |
| WO | 2016189092 A1 | 12/2016 |
| WO | 2016198075 A1 | 12/2016 |
| WO | 2017092766 A1 | 6/2017 |

OTHER PUBLICATIONS

European Patent Office, International Search Report and Written Opinion in PCT Application No. PCT/DK2018/050360, dated Mar. 20, 2019.

* cited by examiner

WIND TURBINE BLADES AND MANUFACTURING SYSTEMS AND METHODS USING SEGMENTED BLADE ASSEMBLY

TECHNICAL FIELD

The present invention relates generally to wind turbines and, more particularly, to wind turbine blades and the manufacture and assembly thereof.

BACKGROUND

Wind turbines are used to produce electrical energy using the renewable resource of wind flow and without combusting a fossil fuel. Generally, a wind turbine converts kinetic energy into mechanical energy and then subsequently converts the mechanical energy into electrical energy. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades mounted thereto and extending radially therefrom.

Generally, electrical energy production from a wind turbine increases with the size of the wind turbine. Therefore, modern multi-megawatt wind turbines are massive structures and the trend toward larger structures continues. These massive structures are assembled from component parts. As such, many wind turbines have their various component parts delivered in separate pieces to the site of the wind turbine installation. For example, the wind turbine tower, which may be formed by several tower sections, may be delivered to the installation site. The nacelle may be delivered to the installation site and mounted on the tower following its assembly. Lastly, the blades, themselves being quite massive in size, have been conventionally transported individually to the installation site. Each wind turbine blade is raised and secured to a rotor hub normally via a pitch bearing, whereby the load from the wind turbine blade is transferred to the rotor hub.

The massive wind turbine blades are complex structures unto themselves. They are often constructed of a shell, spar caps, and one or more shear webs. The shell is typically a layered composite and forms the exterior surface of the blade that has an aerodynamic foil shape and that encloses the shear webs and spar caps, which provide the structural aspects of the blade. The shear webs and spar caps may take the form of an internal spar that enables the shell to resist flap and edgewise loading during use of the blade.

Conventional wind turbine blades are typically produced by a manually intensive production process performed at a centralized site. In addition, production of large wind turbine blades requires a large amount of capital in the form of large facilities and mould making equipment. In one such process, two large-scale moulds must first be produced. The moulds define the shape of the wind turbine blade. Each mould forms approximately one half of the shell of the wind turbine blade.

Once the moulds are manufactured, a laminate structure that forms the shell of the wind turbine blade is produced from each mould by placing a fiber-resin composite in the mould. A process that may include vacuum infusion may be utilized to infuse a fabric, such as a glass or carbon fiber fabric, with resin in the mould. Robots and other automation may be used to assist in this process and to reduce the otherwise manually intensive process of laying up the moulds. The resin is then cured. The cured fiber-resin composite structure conforms to the mould surface to form one-half of the shell of the wind turbine blade. With the aid of cranes, the two shell halves are extracted from their respective moulds and bonded together. Alternatively, the two shell halves may be bonded together while in their respective moulds. Once bonded, the blades are finished. Alternative methods of making wind turbine blades using various forms of additive manufacturing (3D printing) are also known, but once again, the equipment for making the blade is at a centralized site like the moulds because the scale of wind turbine blades is so large.

These large turbine blades are then transported from the manufacturing facility to the installation site, which may be hundreds to thousands of kilometers away. The transport process is costly and sometimes rendered nearly impossible based on the large size of the finished blades and the terrain that must be traversed to move the blades between the centralized manufacturing site and the final installation location for the wind turbine. Moreover, blades can be subjected to vibrations, shocks, and other damage during transport on trains, boats, vehicles, and the like, and repairing this damage from transport adds significantly to the cost of installing wind turbines. These problems have become more exacerbated as the locations for wind turbine installations become more remote and inaccessible from major routes of transportation. As such, it would be desirable to devise a wind turbine blade manufacture process capable of being carried out on a small scale. This may allow the establishment of small or temporary production sites, preferably nearby a wind turbine installation site. In turn, this may allow to limit the amount of transport that needs to be done with a finalized, assembled wind turbine blade.

As is generally described above, conventional manufacturing techniques require a large capital investment, large factories, and long lead times. Furthermore, some of the conventional blade assembly processes require extensive manual labor, which adds to the cost of the blades and the wind turbine. Overall, with a centralized mould manufacturing process, the cost of producing blades and the transportation costs can limit adoption of wind turbine technology.

Several systems and methods have started to be developed for addressing the transport cost and logistics problems, but further improvement remains possible. In this regard, one example of a blade manufacturing method is described in International Patent Application Publication No. WO 2017/092766 to Vestas Wind Systems, the original Applicant of the present application In that published application, a method for assembling a wind turbine from a series of 3D printed sections is described. As shown in FIG. 4 of this published application, the sections are formed with internal bores that collectively define conduits for strengthening elements or rods to be inserted through during assembly of the blade. The sections are connected at abutting ends using elongated joints 52 as shown in FIG. 6A, with optional adhesive joining or melting at the joints as well according to paragraph [0054]. This wind turbine blade assembly method essentially requires 3D printing technology to be used, as the more conventional moulding equipment is typically unable to reliably form the complex internal structures of this blade (including the bores that form the conduit for the strengthening elements), and such technology may not always be cost effective or readily accessible. Furthermore, post-assembly processing of the outer surface of the blade is sometimes required as a result of the outer airfoil profile of the blade being defined by individual, separately connected sections. Accordingly, further improvements in the blades and method of manufacture remain possible.

Additional conventional examples of wind turbine blade manufacturing systems and methods are shown in Chinese Patent Application Publication No. CN102200100 (splicing together partial portions of a wind turbine blade) by DEC Dongfang Turbine Co.; European Patent No. 2 246 558 (separate leading edge segments joined to remainder of blade) by General Electric Company; U.S. Pat. No. 7,393,184 (modular wind turbine blades constructed by running tension cables through sections of airfoil body) by General Electric Company; U.S. Pat. No. 7,854,594 (segmented wind turbine blade with segments connected by internal spar) by General Electric Company; and International Patent Application Publication No. WO 2005/064156 (segmented wind turbine blade with hinged sections) by Airbus. These applications and patents describe various methods of constructing and using segmented wind turbine blades, but the manufacturing costs remain high and the assembly process can be very complicated in some of these designs. Therefore, alternative methods of wind turbine blade construction are desirable.

Accordingly, there is a need for improved wind turbine blades and methods for manufacturing wind turbine blades that reduce the capital investment required and eliminate the high costs of human labor and any transportation issues associated with many conventional designs.

SUMMARY

A system and method are described herein for manufacturing a wind turbine blade. The system and method automate many of the construction and assembly steps so that human labor costs are minimized as well in blade production. The invention therefore addresses many of the drawbacks discussed above with conventional wind turbine blade manufacturing and transport practices. Furthermore, the wind turbine blade manufacturing system and method described herein may be implemented a proximate to the final installation site of a wind turbine that is to use the blade. The blade thereby may not need to be transported in a final assembled form to the final installation site over long distances, which reduces costs significantly, especially when the installation site is remote as is becoming more typical in the expanding footprint of wind energy.

In one embodiment, the wind turbine blade made by the system and method of this invention includes a plurality of shell core sections, a plurality of strengthening elements, and an outer surface material layer. The shell core sections are coupled together end-to-end to collectively define a span length of the blade between a root end and a tip. Each of the shell core sections defines a sidewall forming a tubular structure and defining an external surface. The sidewall includes a plurality of external grooves recessed into the external surface. The strengthening elements are positioned to extend within the external grooves and along the span length, such that the strengthening elements are configured to reinforce the blade under bearing loads during use of the wind turbine. The outer surface material layer covers the external surface and the strengthening elements, and the outer surface material layer thereby defines an external profile of the blade. The plurality of strengthening elements, and the outer surface material layer are consolidated together by curing of the outer surface material layer. Preferably, the shell core sections, the strengthening elements, and the outer surface material layer are collectively assembled and cured into a final consolidated part by a manufacturing system located proximate to the site of installation for the wind turbine that is to use the wind turbine blade.

In one aspect, each of the shell core sections in the wind turbine blade is formed by additive manufacturing, e.g., 3D printing. Alternatively, each of the shell core sections is formed by moulding. Regardless of the method chosen for forming the shell core sections, these sections can be manufactured from raw materials at a site away from or proximate to the site of installation for the wind turbine. They may be transported in the shell core section form because these individually-formed shell core sections are small relative to the final blade. In some embodiments, each of the shell core sections includes opposing ends having interlocking structures, which engage one another on adjacent shell core sections to maintain adjacent shell core sections in abutting end-to-end contact.

In another aspect, the strengthening elements in the blade are defined by carbon fiber rovings that are configured to transfer loads across multiple ones of the plurality of shell core sections. The strengthening elements in the external grooves therefore define load pathways or "highways" for carrying the varying loads applied to a wind turbine blade in use as a result of wind and wind gusts. The size of the external grooves and the corresponding size of the strengthening elements may be generally uniform across the external surface in some embodiments, but alternatively, the size of the external grooves and the density per area of the strengthening elements can vary over different portions of the external surface of the shell core sections. For example, the blade typically includes a web extending within the tubular structure of the shell core sections to reinforce the blade, and the web connects to the sidewall at sparcap regions. The external grooves and the density per area of the strengthening elements are larger adjacent the sparcap regions in this embodiment, as compared to other regions of the blade. In one aspect, the system may be configured for additive manufacturing of the outer surface material layer. The system may be configured for depositing uncured material on the shell core sections and on the strengthening elements. Deposited, uncured material may thereby envelop the strengthening elements. The system may further be configured to consolidate together the plurality of strengthening elements and the outer surface material layer by curing of the outer surface material layer. Other configurations of the strengthening element density are possible in other embodiments consistent with the invention.

In a further aspect, the wind turbine blade includes a web extending within the tubular structure of the shell core sections and along the span length to reinforce the blade, and at least one web flange extending within the tubular structure and positioned between the web and the shell core sections. The web flange(s) strengthen the blade at junctions of the web and the shell core sections. At least one of, if not both of, the web and the web flange are formed from a different material than the shell core sections. These different materials can be provided by the additive manufacturing and moulding processes, when those are used to form the shell core sections, or these elements can be added to the plurality of shell core sections after these sections are connected. In such embodiments, the shell core sections may define an elongated recess or groove configured to receive the web. The wind turbine blade manufactured by the system and method described herein may be used with wind turbines of various sizes and configurations, with similar or better functionality than the conventional designs.

In another embodiment of the invention, a manufacturing system is provided for assembling a wind turbine blade. The system may be located proximate to a site of installation for a wind turbine. The system includes a creel of feeders configured to apply strengthening elements onto a plurality of shell core sections coupled together end-to-end and fed through the creel. The shell core sections include a sidewall defining an external surface with a plurality of external grooves recessed into the external surface such that the strengthening elements are laid into the external grooves. The manufacturing system may be a local manufacturing system. The manufacturing system also includes a deposition station positioned to receive the shell core sections and strengthening elements from the creel. The deposition station is configured to apply an outer surface material layer in fluid form to cover the external surface and the plurality of strengthening elements. A curing station is positioned to receive the shell core sections, the strengthening elements, and the outer surface material layer from the deposition station. The curing station heats and consolidates these elements together into a final consolidated part, with the outer surface material layer defining an external profile of the blade following curing. Preferably, the creel of feeders, the deposition station, and the curing station may each be located proximate to the site of installation for the wind turbine. The blade can then be installed at the wind turbine, which is advantageously proximate to the location of assembly/manufacture.

The manufacturing system in one aspect includes a tensioner configured to apply tension force to the strengthening elements applied to the plurality of shell core sections. The system may also include a shell section supply station configured to supply the shell core sections to the blade manufacturing system. The shell core section supply station may deliver the shell core sections to the creel for further assembly steps. The blade manufacturing system may optionally include a shell core manufacturing station, to produce the shell core sections from raw material. Optionally shell core sections may be pre-manufactured at a separate site at a shell core section manufacturing site, and transported to the wind turbine blade manufacturing location. The shell section manufacturing station or site may include at least one mould, or a 3D printer configured to form the shell core sections by additive manufacturing. In some embodiments, the shell section manufacturing station also forms a reinforcement web and/or web flange(s) inside the shell core sections.

In a further embodiment of the invention, a method for manufacturing a wind turbine blade is provided. The method may preferably be conducted proximate to a site of installation for a wind turbine using the blade. The method includes connecting a plurality of shell core sections together in abutting end-to-end contact. Each of the shell core sections is configured to define a portion of a span length of the wind turbine blade, and each of the shell core sections defines a sidewall with an external surface and a plurality of external grooves recessed into the external surface. The method also includes applying a plurality of strengthening elements within the external grooves so as to extend along the span length of the blade. An outer surface material layer is deposited in fluid form to cover the external surface and the plurality of strengthening elements. The method then includes curing the shell core sections, the strengthening elements, and the outer surface material layer to produce a final consolidated part defining the blade.

As set forth above with respect to the local manufacturing system, the method may include additional features and steps in other aspects. For example, the method can also include applying tension to the plurality of strengthening elements and maintaining the tension through the steps of deposition the outer surface material layer and curing. The method may also include applying a differing density per area of the strengthening elements on different portions of the external surface of the shell core sections, such as a higher density in the sparcap regions adjacent a reinforcement web within the blade being manufactured. The method of may preferably further comprise forming the outer surface material layer by additive manufacturing. This may include depositing uncured material on the shell core sections and on the strengthening elements. Deposited, uncured material may thereby envelop the strengthening elements. The method may further comprise consolidating together the plurality of strengthening elements and the outer surface material layer by curing of the outer surface material layer. The method preferably further includes manufacturing the shell core sections from raw material proximate to the site of installation. In one aspect, this may be done by moulding the shell core sections in at least one mould, while in another aspect, this may be done by additive manufacturing. The methods of the invention described herein minimize the costs needed for human labor in making wind turbine blades as well as the transport costs associated with moving the blades to the final installation sites for wind turbines.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
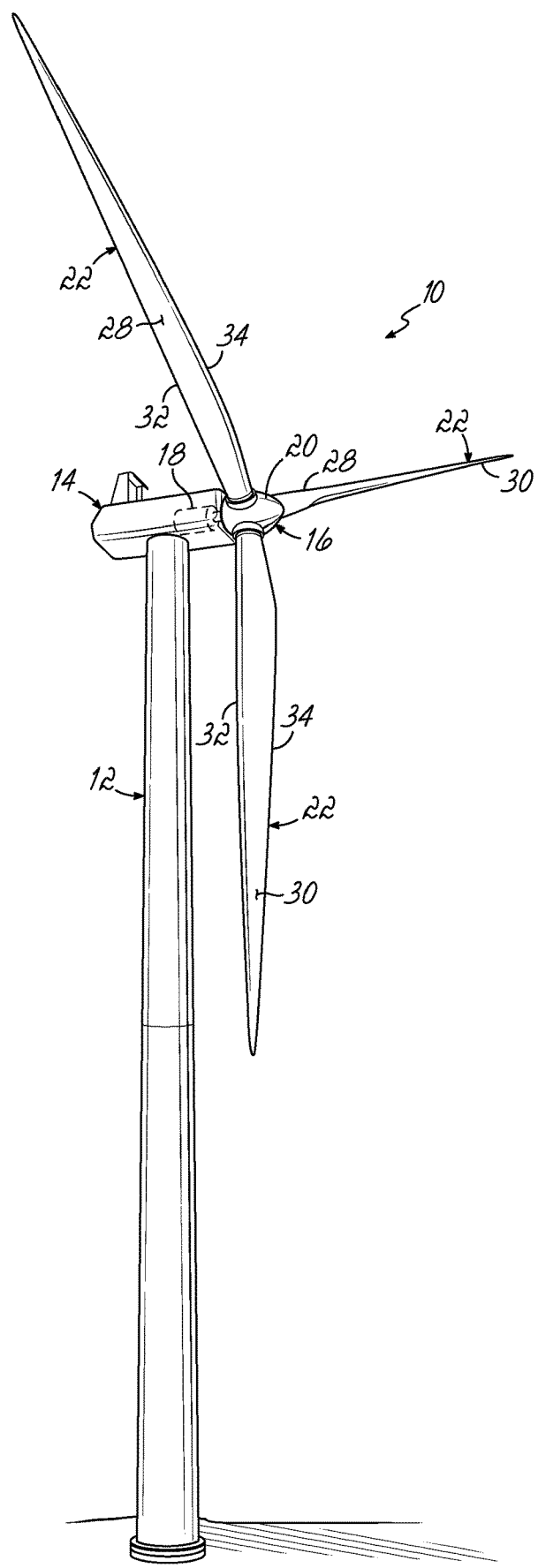
FIG. 1 is a perspective view of a wind turbine including a plurality of blades, the blades being in accordance with one embodiment of the invention.

With reference to FIGS. 1 through 7, an exemplary embodiment of a wind turbine 10 having a plurality of blades 22, as well as a method and manufacturing system for assembling the blades 22 are shown in detail, in accordance with the principles of the invention. Advantageously, the wind turbine blades 22 are assembled from a plurality of shell core sections 26 that can be manufactured by equipment proximate to or remote from the site of installation of the wind turbine 10. Pre-manufactured shell core sections 26 may be transported to the site of blade manufacture more easily than a completely pre-assembled wind turbine blade or finished wind turbine blade could be transported. Regardless of whether the shell core sections 26 are made proximate to the site of blade manufacture or transported to this location, the final assembly of the blade 22 may optionally be provided by a local manufacturing system 24 located proximate to the site of final installation. As a result, the various problems with long-distance transport of finished wind turbine blades to remote locations where wind turbines are to the installed may be avoided when performing final assembly of wind turbine blades 22 proximate to the site of installation, in accordance with aspects of the description provided herein. Furthermore, the methods and systems used to assemble wind turbine blades 22 in this invention allow for construction of large blades (often used with modern wind turbine designs) and blades of varying external profiles and configurations, without the need for a significant amount of manual labor and preferably, essentially right where the blades 22 will be needed. These and other technical effects achieved by the invention are described in further detail below.

With reference to FIG. 1, the wind turbine 10 includes a tower 12, a nacelle 14 disposed at the apex of the tower 12, and a rotor 16 operatively coupled to a generator 18 housed inside the nacelle 14. The rotor 16 of the wind turbine 10 includes a central hub 20 and a plurality of wind turbine blades 22 that project outwardly from the central hub 20 at locations circumferentially distributed around the hub 20. As shown, the rotor 16 includes three wind turbine blades 22, but the number of blades may vary from one wind turbine to another. The wind turbine blades 22 are configured to interact with air flow to produce lift that causes the rotor 16 to spin generally within a plane defined by the wind turbine blades 22.

According to embodiments of the invention, one or more of the wind turbine blades 22 shown in FIG. 1 may be assembled proximate to the site of installation for the wind turbine 10 using a blade manufacturing system 24. The blade manufacturing system may be implemented at an assembly site for pre-manufactured elements of the blade, such as shell core sections (26) and strengthening elements (62), described further below. A suitable manufacturing system is described in further detail with reference to FIGS. 4 through 6 below. The blade manufacturing system 24 joins the shell core sections 26 (shown in FIG. 2) together with other components to form the finalized wind turbine blade 22. When performed at a local manufacturing system 24, the need for transporting finished blades across long distances, e.g. using public roads or railway infrastructure, to remote locations where the wind turbine 10 may be installed, may be avoided.

With continued reference to FIG. 1, in addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found. The rotor 16 of the wind turbine 10, which is represented as a horizontal-axis wind turbine, serves as the prime mover for the electromechanical system. Wind exceeding a minimum level will activate the rotor 16 via the wind acting on the blades 22, and thereby cause rotation in a substantially perpendicular direction to the wind direction. This rotation activates the generator 18 which then produces electrical energy.

The wind turbine 10 may be included among a collection of similar wind turbines belonging to a wind farm or wind park (not shown) that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical energy is supplied from the generator 18 to the power grid as known in the art.

Figure 2:
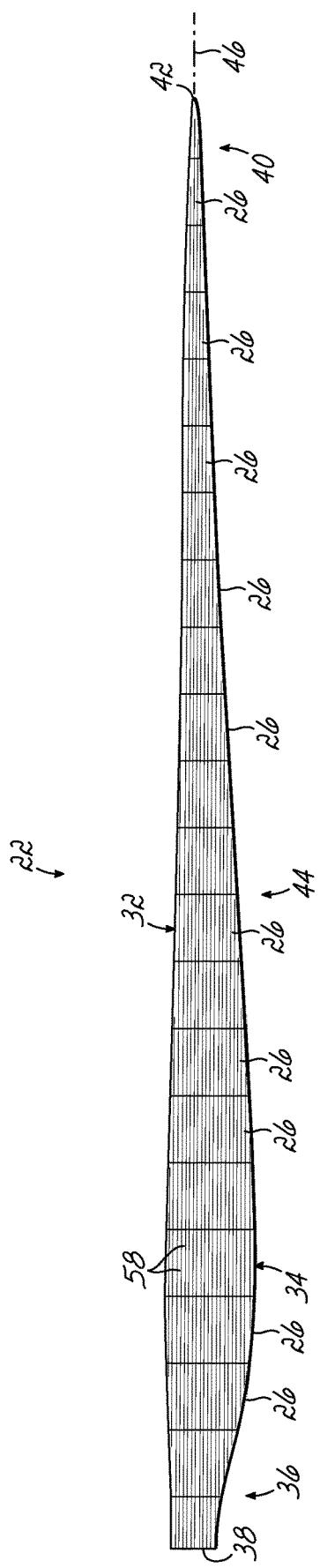
FIG. 2 is a top view of one embodiment of a wind turbine blade that may be used with the wind turbine of FIG. 1, the wind turbine blade in an initial assembly step in this view to show the various shell core sections joined to make the blade.

As noted above, localized wind flow causes the blades 22 to activate rotation of the rotor 16. To this end, air flowing over the wind turbine blade 22 produces lift between a suction surface 28 and a pressure surface 30 of the wind turbine blade 22 to cause the rotor 16 to rotate. As is understood in fluid dynamics, air flowing over the wind turbine blade 22 forms a boundary layer that may separate from the outer surface of the wind turbine blade 22 between a leading edge 32 of the wind turbine blade 22 and a trailing edge 34 of the wind turbine blade 22, depending on air speed, geometry (e.g., angle of attack), or other factors. The leading edge 32 and the trailing edge 34 may extend from a root region 36 of the wind turbine blade 22 including a root end 38, at which location the wind turbine blade 22 is secured to the rotor 16, to a tip region 40 including a tip 42 of the wind turbine blade 22. A mid span region 44 extends between the root region 36 and the tip region 40. These various regions of the blade 22 are schematically shown most clearly in FIG. 2, which is a view of the shell core sections 26 connected but before additional steps of assembly occur as set forth below, and it will be understood that the various surfaces 28, 30 and edges 32, 34 will be defined by outer layers of the blade 22 in a final construction rather than by the shell core sections 26. FIG. 2 also illustrates the longitudinal axis 46 of the blade 22 that extends along the span length of same.

Figure 3:
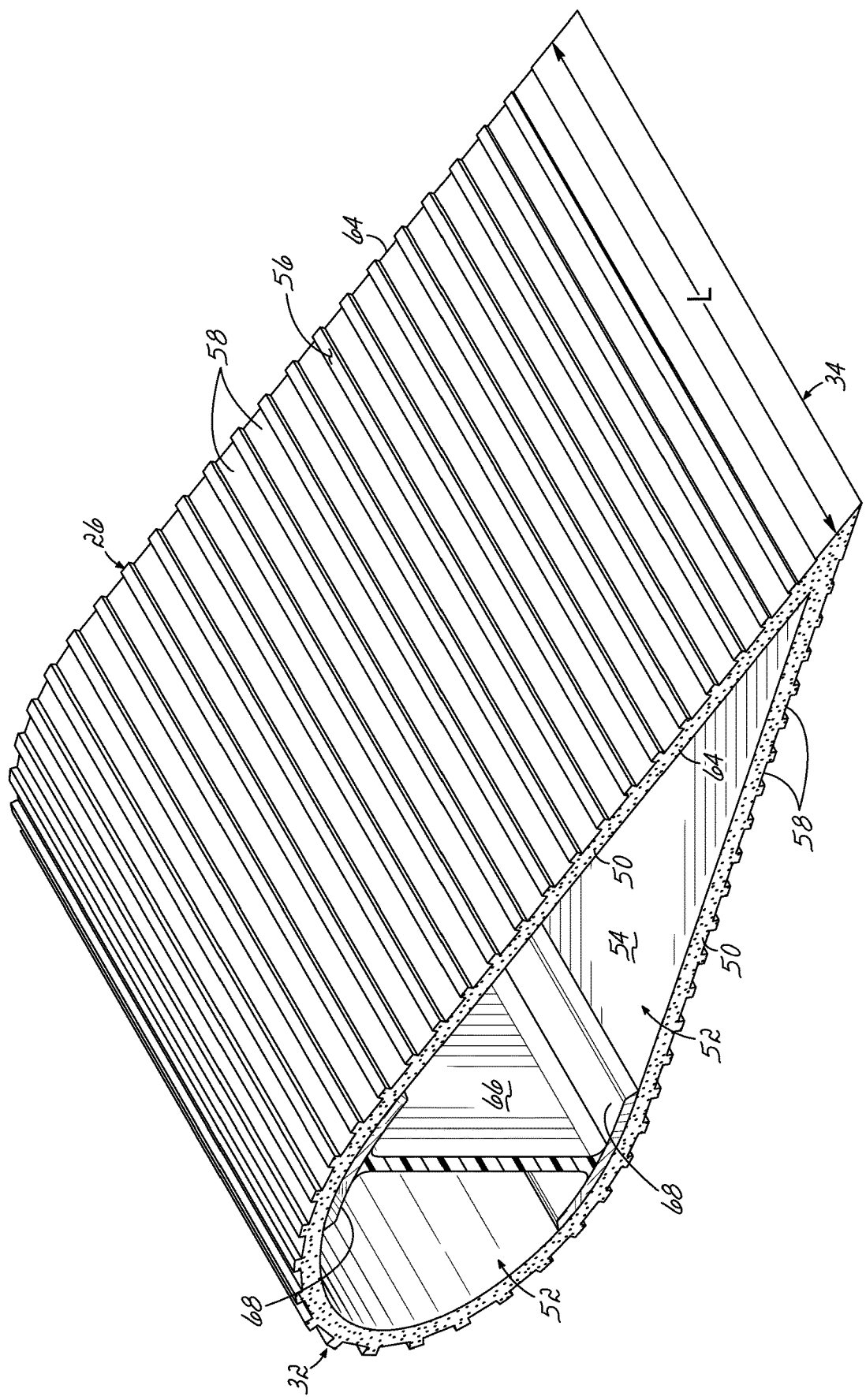
FIG. 3 is a top perspective view of one of the shell core sections of the wind turbine blade of FIG. 2.

One selected shell core section 26 is shown in FIG. 3, in accordance with one exemplary embodiment of the invention. This shell core section 26 may be any of the plurality of shell core sections 26 that connect to produce the inner framework of the entire wind turbine blade 22, as shown most clearly in FIG. 2. In this embodiment, each of the shell core sections 26 defines a relatively small portion of the span length of the blade 22, and these shell core sections 26 come together as building blocks to define the overall length and profile of the blade 22. By way of example only, the individual shell core sections 26 may be about 1 meter to about 2 meters in length ("L" in FIG. 3) though embodiments of the present invention are not limited to any specific length. Consequently, each of the shell core sections 26 may be designed with a shape and profile to define the corresponding unique portion of the blade 22, which varies in width and height along the length, as well understood in the art. Moreover, it will be understood that redesigns of the overall shape of the blade 22 can easily be accommodated by manufacturing or supplying the shell core sections 26 with the redesigned shape or contour profiles. Likewise, while the shell core sections 26 making up the blade 22 in FIG. 2 are of generally equal length along the longitudinal axis 46, other embodiments are possible within the scope of the invention in which the shell core sections 26 have varying lengths as well as height-width profiles. The shell core sections 26 may be made from raw material as a preliminary, integrated part of a blade manufacture process. Alternatively, the shell core sections may be pre-manufactured from raw material, e.g. at a different site from the blade manufacture system, and transported to the site for blade manufacture.

With continued reference to FIG. 3, the shell core section 26 includes a sidewall 50 having a generally teardrop-shaped profile that is configured to be rounded adjacent the leading edge 32 of the blade 22 and narrowing to a sharp end adjacent the trailing edge 34 of the blade 22. The sidewall 50 is generally continuous such that it defines a tubular structure for the blade 22, with a hollow space 52 surrounded by the sidewall 50. The sidewall 50 includes an interior surface 54 facing towards the hollow space 52 and an external surface 56 facing outwardly. A series of external grooves 58 are provided to be recessed into the external surface 56 along the outside of the sidewall 50, thereby providing a generally fluted exterior for the shell core section 26. The external grooves 58 extend along the entire length of the shell core section 26, which is also along the span length or longitudinal axis 46 following assembly of the plurality of shell core sections 26.

As set forth in further detail below, the external grooves 58 are configured to be aligned with similar sets of external grooves 58 such that these external grooves 58 can receive elongated strengthening elements 62 (not shown until FIGS. 4 and 7) in the form of carbon fiber rovings or the like, in a further step of assembly for the wind turbine blades 22. Such strengthening elements 62 can help transmit and carry loads across the plurality of separately-formed shell core sections 26. The specific number and size/shape of the external grooves 58 may vary from the generally uniform arrangement shown in this Figure in other embodiments of the blade 22 consistent with the invention. For example, while a generally rectangular cross-section is defined by each of the external grooves 58 in this embodiment, the shape of the external grooves 58 and the corresponding strengthening elements could be varied in other embodiments.

In this embodiment, the shell core section 26 includes opposing ends 64 in the length direction defined by the sidewall 50. The opposing ends 64 are generally open because of the tubular structure defined by the shell core section 26, and this allows for the fully assembled wind turbine blade 22 to have an elongated interior space defined by each of the hollow spaces 52 brought into alignment when opposing ends 64 of the shell core section 26 are placed in abutting end-to-end contact with adjacent shell core sections 26. Although the opposing ends 64 are shown in the embodiment of FIG. 3 to have a smooth edge, it will be appreciated that some embodiments of the wind turbine blade 22 will include interlocking structures (such as a hook-shaped projection and a corresponding receptacle, for example) located on or adjacent the opposing ends 64. The interlocking structures can engage the same structures on abutting shell core sections 26 to maintain adjacent shell core sections 26 in the desired position with abutting end-to-end contact.

It is known that large wind turbine blades 22 often need internal reinforcement to help the outer shell carry the loads applied by the environmental wind. Accordingly, the shell core section 26 of FIG. 3 also includes an internal web 66 that extends across the hollow space 52 to junctions with the sidewall 50 on opposite sides of the shell core section 26. The internal web 66 can be directly coupled to the sidewall 50 in some embodiments, but in the illustrated embodiment, separate web flanges 68 are inserted between the internal web 66 and the interior surface 54 of the sidewall 50 at junctions thereof. The web flanges 68 help transfer loads between the web 66 and the sidewall 50. As with the opposing ends 64 of the sidewall 50, the web 66 and web flanges 68 may also include interlocking structures for connection to similar structures in adjacent shell core sections 26 in other embodiments of the invention not illustrated here. Alternatively, the web 66 and the one or more web flanges 68 could be separately provided as an elongated piece configured to extend through multiples of the shell core sections 26, and then inserted/added to the plurality of shell core sections 26 after these shell core sections 26 are connected in other embodiments.

As shown by the different cross-hatchings visible in FIG. 3, each of the sidewall 50, the web 66, and the web flanges 68 may be formed from different materials in this embodiment. This use of different materials allows for different structural qualities to be provided at the different portions of the wind turbine blade 22. For example, the sidewall 50 may be manufactured from a low-density, lightweight, and possibly foamed rigid material. Other types of materials known for use in making wind turbine blade shells may also be used, including but not limited to, glass fiber composites and similar pultrusions. The web 66 may be manufactured from a material with higher strength or density, but this element is often typically formed from fiber-reinforced composite materials with higher stiffness than the material defining the sidewall 50. Metallic girders or reinforcements may also be included in the design, but these types of materials are not shown in the exemplary embodiment. It will be understood that some or all of the sidewall 50, the web flanges 68, and the web 66 may be provided in the same material in other embodiments.

Regardless of the specific material(s) chosen for the shell core sections 26 and associated elements, these shell core sections 26 are sized small enough to allow for easy transport to a site of a blade manufacturing system 24, if required, which may be positioned proximate to the site of installation for the wind turbine 10. Alternatively, the shell core sections 26 can be made by a shell section manufacturing station included in a local manufacturing system 24, in some embodiments. The transport of the smaller shell core sections 26 or the raw materials needed to make the shell core sections 26 to remote locations where a wind turbine 10 is to be installed is less complex and expensive than transport of fully pre-assembled or finalized blades to the same remote locations, so the various embodiments of this invention provide advantages over conventional manufacturing designs and processes.

The shell core sections 26 may be formed in various methods, each of which could be used at a shell section manufacturing station. A shell manufacturing station may be established at a site remote from a blade manufacturing system 24. Optionally, a shell manufacturing station may be included in a blade manufacturing system 24. Each of the shell core sections 26 may be formed by additive manufacturing (also referred to as 3D printing) in some embodiments. To this end, the additive manufacturing may include a layering process, such as VAT photopolymerization, stereo lithography (SL), digital light processing (DLP), selective laser sintering (SLS), selective laser melting (SLM), electron beam melting (EBM), binder jetting, material jetting, direct metal layer sintering (DMLS), or fused deposition modeling (FDM). These processes utilize computer controlled deposition of individual layers of material based on a computer model of a part. The deposited layers are based on discrete cross sections of the model as determined by slicing the model into a finite number of individual model layers. Each model layer is then reproduced by depositing a layer of material from a 3D printer. By constructing each layer, one layer on a preceding layer, the computer model of the part is used to manufacture a real part, in this case, the plurality of shell core sections 26 needed to assemble the wind turbine blade 22. The additive manufacturing process can utilize different materials as noted above to generate each of the sidewall 50, web 66, and web flanges 68. Moreover, any design changes to the desired profile or components making the blade 22 can be easily implemented when using additive manufacturing because the computer model can be changed, with the printing process following suit automatically. Consequently, the shell section manufacturing station may include a 3D printer in these embodiments, or the shell core sections 26 could be 3D printed in this manner and then transported from a centralized manufacturing site to the blade manufacturing system 24 at a blade assembly site, which may be a local site.

Alternatively, the shell core sections 26 are formed by moulding in other embodiments of the invention. In this regard, the shell section manufacturing station may include at least one mould configured to form the shell core sections 26. The moulding process for blade components is well understood in the art and includes, at a minimum, a lay-up or deposit of raw material (e.g., a polymer type material, a composite material, etc.) into a shaped surface defined by the mould, and then curing and/or consolidation of the part at the mould. In one example, two moulds are used to construct two halves of the finished part, in this case the shell core section 26, and then the two halves of the finished part are coupled together by adhesives or the like. However, more or fewer moulds can be used to generate each shell core section 26. The moulding process can utilize different materials as noted above to generate each of the sidewall 50, web 66, and web flanges 68. The shell core sections 26 that have been formed by moulding can then be supplied directly to the blade manufacturing system 24. Therefore, in aspects, the blade manufacturing system 24 includes a shell core section supply station. Alternatively, the shell core sections 26 that have been formed by moulding can then be transported from a centralized manufacturing site for further processing at a local manufacturing system 24. The shell core sections may be introduced into the blade assembly process at a blade manufacture system 24 via a shell core section supply station.

While 3D printing processes and moulding techniques are described herein, other manufacturing techniques (e.g., manual build, etc.) may be used to manufacture the shell core sections 26. However, the embodiments described above advantageously limit or remove the need for significant manual labor in manufacturing and supplying the shell core sections 26 for further assembly steps to be performed at e.g. a local manufacturing system 24.

Figure 4:
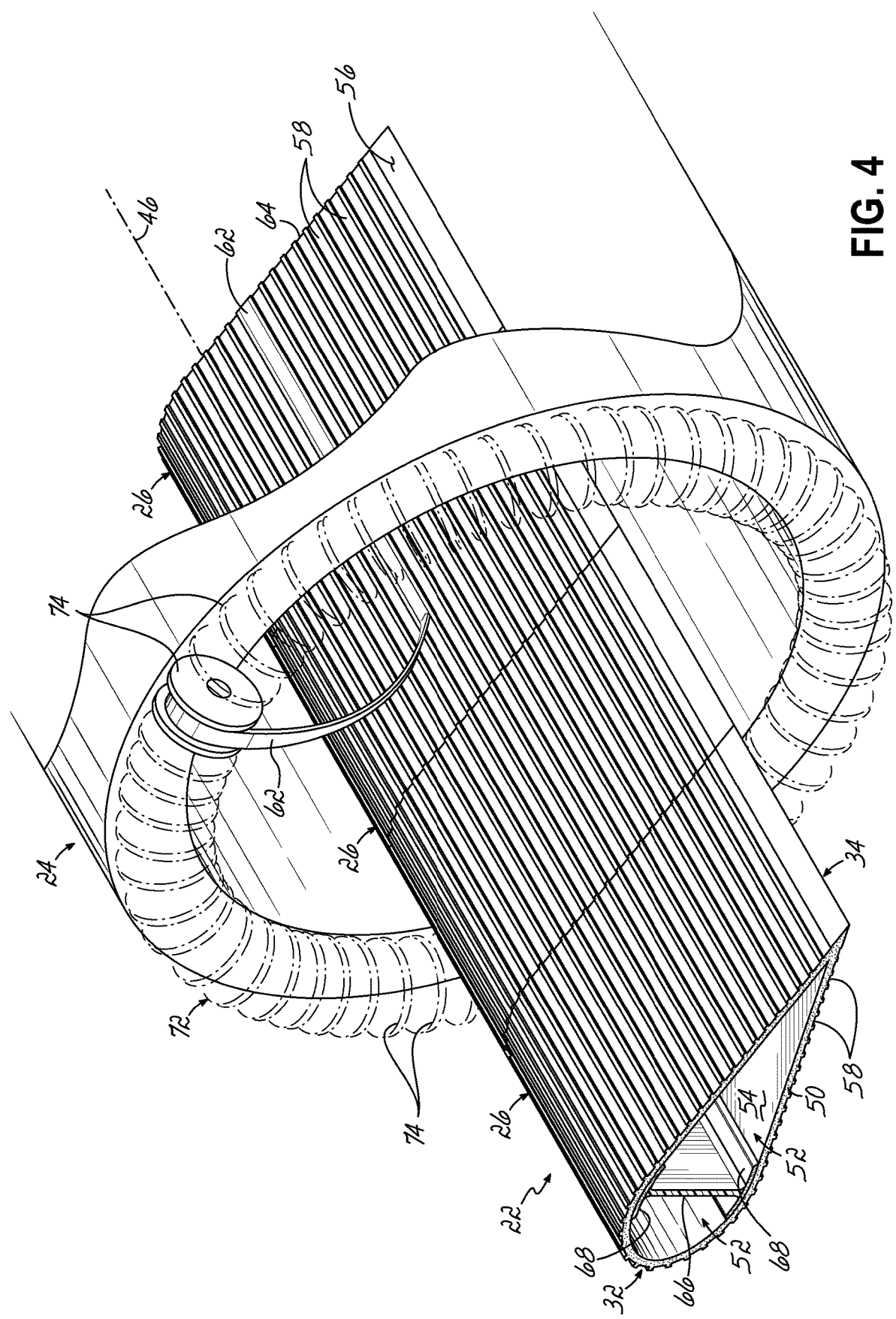
FIG. 4 is a perspective view of a portion of a blade manufacturing system, showing a step of application of strengthening elements in the form of carbon fiber rovings onto the shell core sections of the blade.
Figure 5:
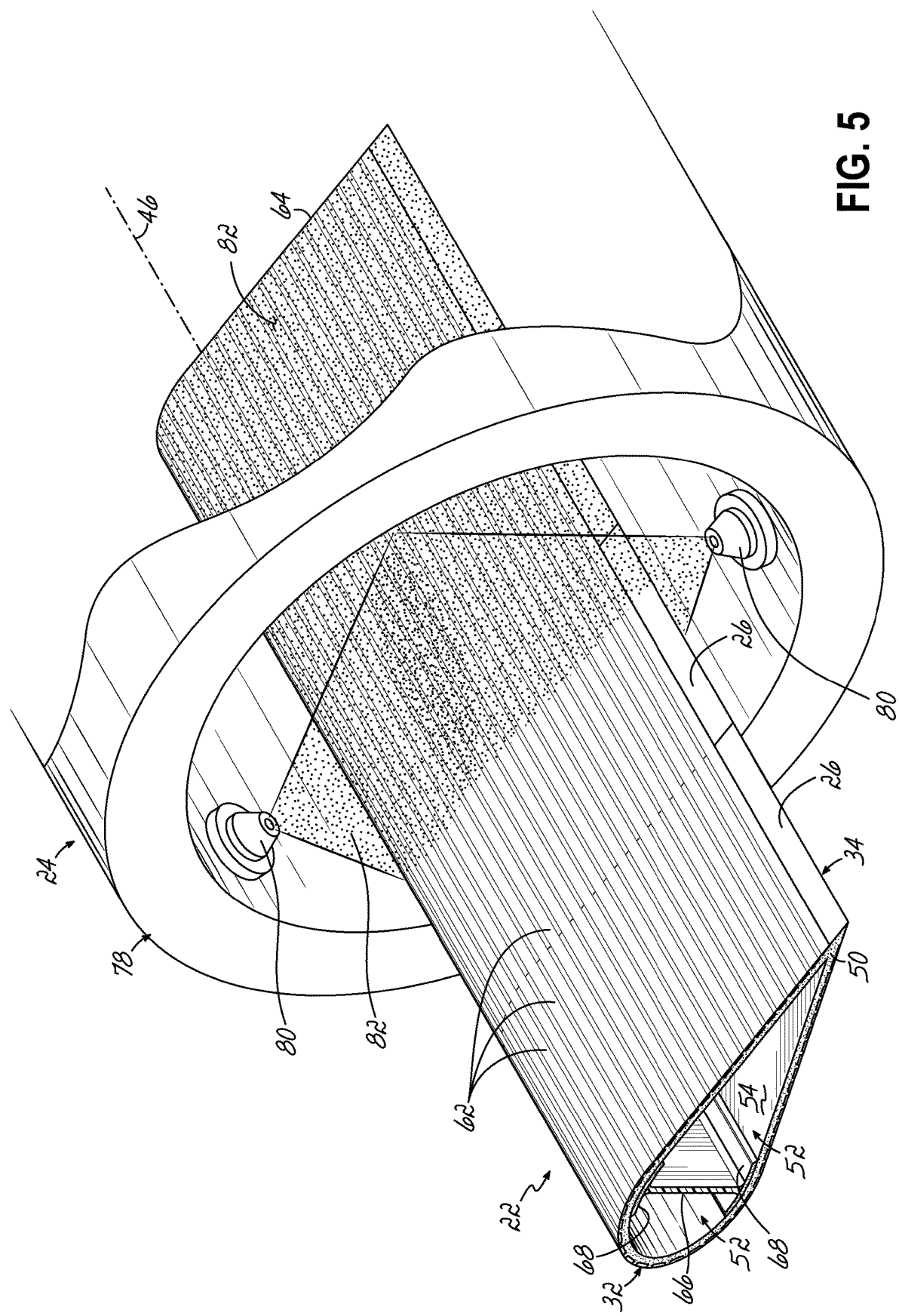
FIG. 5 is a perspective view of another portion of the blade manufacturing system of FIG. 4, showing a step of depositing an outer surface material layer in fluid form onto the shell core sections of the blade.
Figure 6:
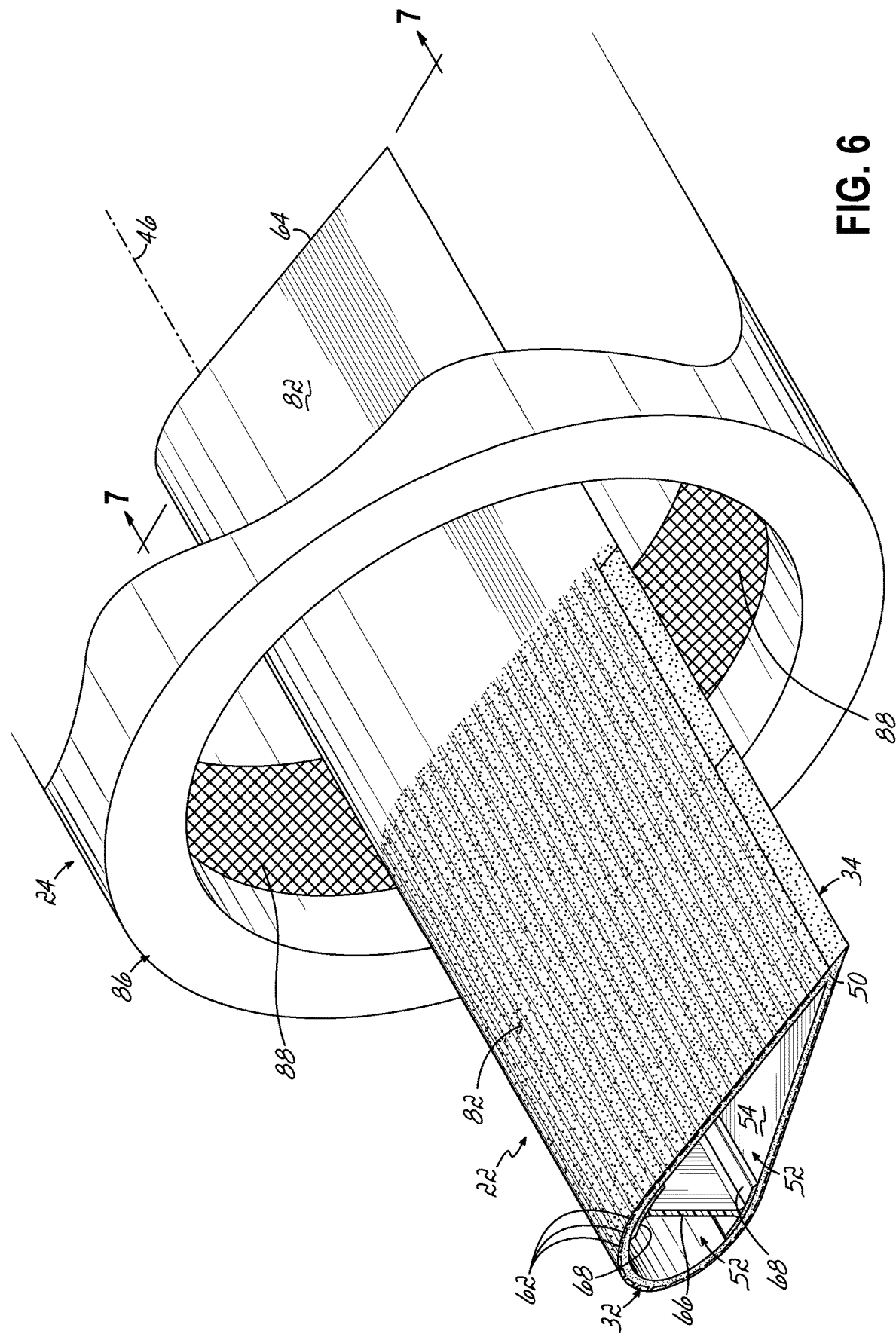
FIG. 6 is a perspective view of another portion of the blade manufacturing system of FIG. 4, showing a step of curing of the blade to consolidate and finalize the assembly of component parts making up the blade.

Further details of a blade manufacturing system 24 and corresponding methods for making the wind turbine blades 22 are shown in FIGS. 4 through 6. Starting with FIG. 4, the blade manufacturing system 24 includes a creel 72 that carries a plurality of feeders 74 configured to apply the plurality of strengthening elements 62 into the external grooves 58 located on a series of shell core sections 26. More specifically, the shell core sections 26 are connected together in abutting end-to-end contact (which may include engaging the interlocking structures, when present), and then the connected shell core sections 26 are fed via a shell core section supply station, through the center of the creel 72 as shown in FIG. 4. The shell core sections 26 are formed such that the external grooves 58 will align with the external grooves 58 on adjacent, abutting shell core sections 26. Accordingly, a continuous elongated carbon fiber roving or a similar type of strengthening element 62 may be supplied from a corresponding feeder 74 for each of the external grooves 58. Although only one strengthening element 62 is shown being laid into one of the external grooves 58 in FIG. 4, it will be appreciated that the creel 72 is arranged such that all the feeders 74 concurrently apply the plurality of strengthening elements 62 into the external grooves 58. Furthermore, although carbon fiber rovings are used as the strengthening elements 62 in this embodiment, other types of materials could be used to reinforce the blade 22 in this portion of the assembly thereof.

The strengthening elements 62 are designed to transfer loads across the plurality of the shell core sections 26, such as bending loads and tensile loads caused by wind when the finalized blade 22 is in use at the wind turbine 10. The application of the strengthening elements 62 is therefore typically done along a substantial majority (or all) of the span length of the blade 22, and the strengthening elements 62 help couple the separately-formed shell core sections 26 to one another. The strengthening elements 62 thereby define load pathways or "highways" for loads on the wind turbine blade 22 to be transferred and carried by an entirety of the blade 22 rather than causing fatigue and stress along only localized portions of the blade 22.

The feeders 74 on the creel 72 may be pre-loaded with a single elongate carbon fiber roving that defines a length equal to the total length of the external grooves 58 that the strengthening element 62 is to be applied in, which may be substantially the entire span length of the blade 22 as described above. The feeders 74 also hold a carbon fiber roving that has a gauge, or size/number of filaments, corresponding to the size of the associated external grooves 58, so as to substantially fill the external grooves 58 recessed from the external surface 56 defined by the remainder of the shell core sections 26. In this regard, while each of the feeders 74 is configured to apply the same size of strengthening element 62 when the size of the external grooves 58 is generally uniform, as shown in FIGS. 4 through 7, the feeders 74 can also be loaded with different shapes and sizes (and/or varying amounts) of strengthening elements 62 in other embodiments consistent with the scope of this invention. One such example will be described with reference to FIG. 8, below.

In order to help maintain the strengthening elements 62 in position upon application into the external grooves 58, the local manufacturing system 24 of this embodiment further includes a tensioner positioned proximate to the creel 72. The tensioner applies tension to the plurality of strengthening elements 62 and maintains this tension through at least a portion of movement through the subsequent steps of blade assembly to be described below (deposit of a surface material layer and curing). For example, the tensioner may include one or more idler wheels or rollers that maintain the strengthening element 62 in a taut condition as it moves towards application in the corresponding external groove 58. Other types of known tension-applying devices can also be used in further embodiments.

It will be appreciated that the creel 72 and feeders 74 are configured to assemble the strengthening elements 62 and the plurality of shell core sections 26 without human action. This further automation of the blade assembly process reduces costs and potential delays that may result when using human resources in such manufacturing. Other than re-loading of the creel 72 with new feeders 74 pre-loaded with another set of strengthening elements 62, no maintenance is required when finishing the assembly of one wind turbine blade 22 and starting assembly of another wind turbine blade 22. Thus, the use of the creel 72 in the local manufacturing system 24 provides advantages over known methods and designs.

Following the step of application of the strengthening elements 62 at the creel 72, the assembly next moves to a deposition station 78 included in the blade manufacturing system 24 and shown in FIG. 5. The deposition station 78 includes a plurality of nozzles 80 connected to a supply of fluid resin (or a similar material), which is configured to form an outer surface material layer 82 when applied onto the external surface 56 of the shell core sections 26 and the strengthening elements 62. In this regard, the nozzles 80 spray or otherwise deposit the fluid resin to coat the entirety of the assembly moving from the creel 72, thereby generating the outer surface material layer 82 in fluid form. The outer surface material layer 82 is designed to define an external profile of the blade 22, so the amount of fluid resin applied by the deposition station 78 is tailored to provide the desired airfoil shape and profile of the finalized blade 22. It will be understood that the nozzles 80 at the deposition station 78 could be replaced by a 3D printing deposition head or a similar dispensing device in further embodiments of the deposition station 78.

Following the step of application of the outer surface material layer 82 at the deposition station 78, the assembly next moves to a curing station 86 included in the blade manufacturing system 24 and shown in FIG. 6. The curing station 86 includes one or more heaters 88 that apply heat energy to the assembly of the shell core sections 26, the strengthening elements 62, and the outer surface material layer 82 to consolidate and/or cure these components into a final consolidated part, e.g., the fully assembled wind turbine blade 22. The movement speed of the assembly through the curing station 86 is configured to allow for sufficient curing of the assembly as it moves past the one or more heaters 88. To this end, the blade 22 is cured portion-by-portion along the span length as the assembly moves through the curing station 86, and this is shown by the blade 22 having a finished (fully consolidated and cured) profile downstream from the heater 88 in FIG. 6. Once the blade 22 has been cured, the outer surface material layer 82 is solidified and defines the external profile of the blade 22, also sometimes referred to its airfoil shape. The curing station 86 may include a different arrangement of heaters 88 and/or other curing elements in alternative embodiments. However, the application of the strengthening elements 62 and the outer surface material layer 82 and the subsequent curing of the blade 22 occurs in a fully automated fashion, thereby reducing any costs associated with human work in blade assembly. Moreover, the assembly steps shown at FIGS. 4 through 6 advantageously occur at the blade manufacturing system 24, which may optionally be at or proximate to the site of installation of the wind turbine 10 and therefore may reduce or eliminates the complex logistics and high costs associated with transporting fully assembled blades 22 to the wind turbine 10. A blade manufacturing system 24 located at or proximate to a site of installation of a wind turbine 10, may thereby be termed a local manufacturing system.

The various parts of the blade manufacturing system 24, including the creel 72, the deposition station 78, and the curing station 86, are shown as part of a continuous tube-like enclosure or housing structure in FIGS. 4 through 6, but it will be understood that different housing structures can be applied in this context. The blade manufacturing system 24 may in particular also include a shell core section 26 supply station for supplying pre-manufactured shell core sections 26 to the blade assembly process at the blade manufacturing system 24. In embodiments, the shell core sections 26 may be manufactured at a shell section manufacturing station, which may optionally also be a part of a blade manufacturing system 24 or which may be remote therefrom. Furthermore, the handling and movement actuation system (not shown) for holding and moving the shell core sections 26 and the blade 22 through the local manufacturing system 24 can be any known design for moving blades and similar elongated workpieces. The blade manufacturing system 24 can be used to manufacture a plurality of blades, including with different designs if necessary, and/or can be disassembled and re-assembled at a new location for use with other installation sites for wind turbines 10. Other modifications within the scope of the invention are possible, as long as the local manufacturing system 24 and the assembly process remain proximate to the installation site for the wind turbine 10 that is to use the wind turbine blade 22 being manufactured.

Figure 7:
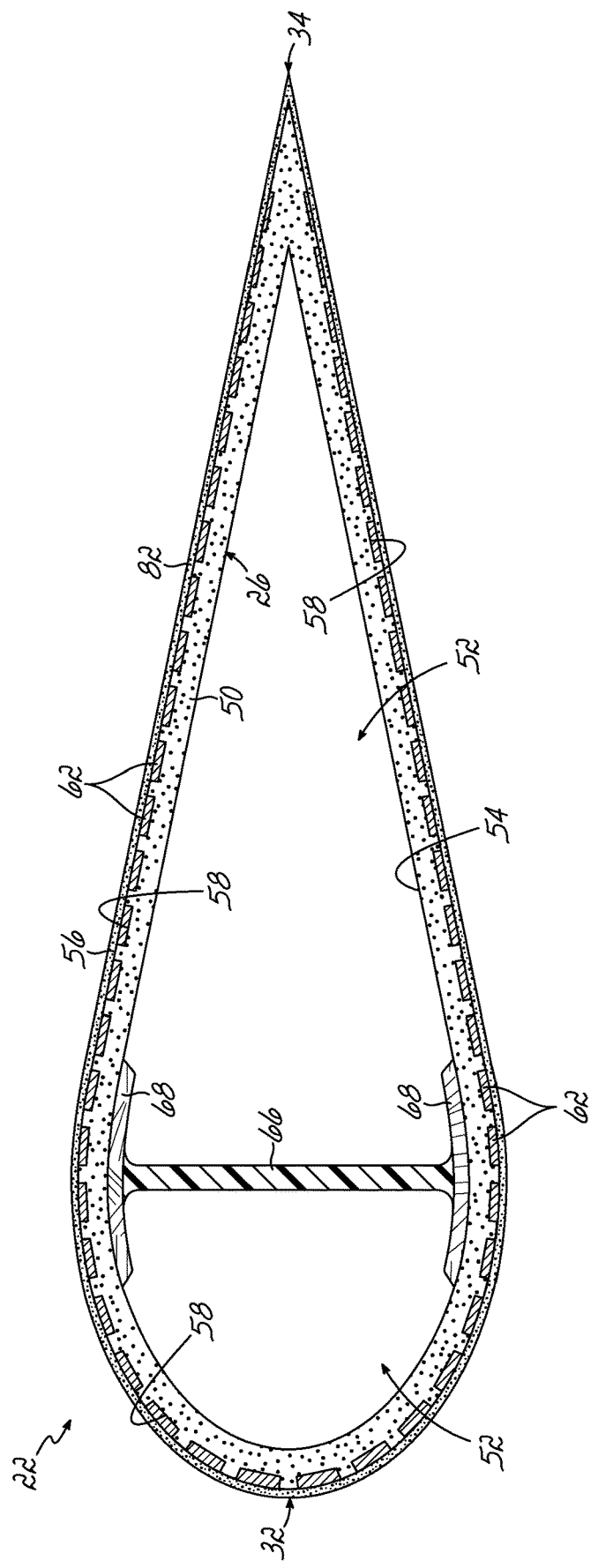
FIG. 7 is a front cross-sectional view of the wind turbine blade of FIGS. 2 and 6, taken along line 7-7 in FIG. 6, and following the curing process at the blade manufacturing site.

A cross section taken transverse to the longitudinal axis 46 and through a portion of the finalized wind turbine blade 22 formed by the blade manufacturing system 24 of this invention is shown in FIG. 7. This cross section is generally along line 7-7 in FIG. 6, for example. The various components making up the wind turbine blade 22 are shown with separate cross-hatching in this view, although it will be appreciated that the curing and consolidation of these elements may intermix the materials to some extent. In the embodiment of FIG. 7, each of the external grooves 58 in the sidewall 50 of the shell core section 26 and each of the corresponding strengthening elements 62 are substantially uniform in size. In addition to these elements, the outer surface material layer 82 defining the exterior profile of the blade, and the web 66 and web flanges 68 positioned across the hollow space 52 on the interior of the blade 22 are also shown. The outer surface material layer 82 therefore defines each of the suction surface 28, pressure surface 30, leading edge 32, and trailing edge of the blade 22. The specific cross-sectional shape of the blade 22 will vary along the span length from this example shown, but the strengthening elements 62 will always be present to help transfer and carry loads across the entire span length of the wind turbine blade 22. Thus, the life span and performance of the wind turbine blade 22 produced by this invention is consistent with or improved from known blade designs. Moreover, this design can be achieved without incurring significant labor costs thanks to the manufacturing method and system as described herein. Moreover, this design can preferably be achieved without incurring significant transportation costs, thanks to the manufacturing system optionally being proximate to the final installation site of the wind turbine 10.

Figure 8:
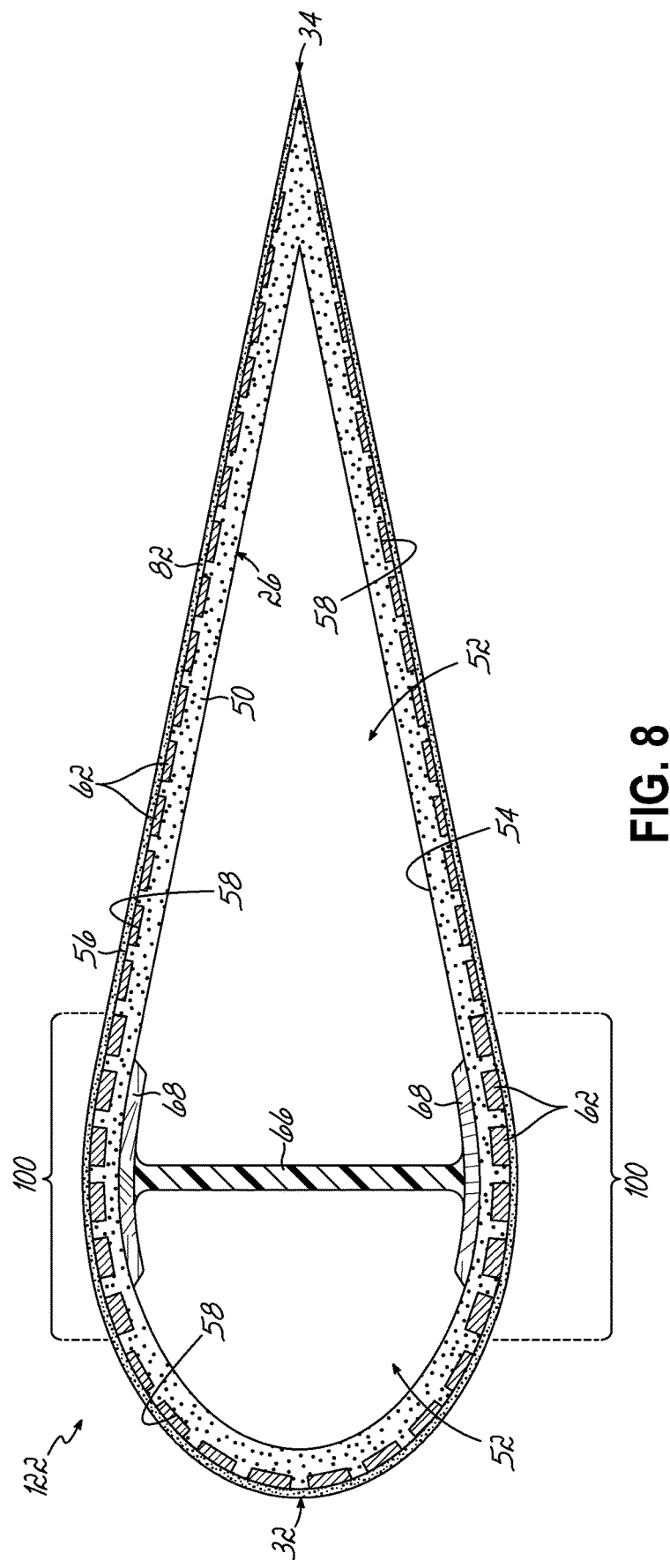
FIG. 8 is a front cross-sectional view of another embodiment of a wind turbine blade in accordance with this invention, the wind turbine blade including portions that receive a higher density per area of strengthening elements as compared to other portions of the blade.

An alternative embodiment of the wind turbine blade 22 (numbered 122 in FIG. 8) made by the blade manufacturing system 24 is shown in FIG. 8. In this embodiment, the size of the external grooves 58 on the shell core sections 26 varies in different portions of the external surface 56. Likewise, the size or gauge of the strengthening elements 62 is also varied to remain consistent with the different sizes of the external grooves 58. In the example shown, the wind turbine blade 22 (numbered 122 in FIG. 8) defines sparcap regions 100 adjacent junctions of the web 66 and the shell core sections 26, which is also adjacent the web flanges 68 when those elements are present. The size of the strengthening elements 62 in this embodiment varies in such a manner that larger strengthening elements 62 or a higher density per area of the strengthening elements 62 is provided at the sparcap regions 100 of the blade 22 (numbered 122 in FIG. 8). Advantageously, this allows for a larger portion of loads applied to the blade 122 to be transmitted along the location where the web 66 reinforces the blade 22 against such loads. As described above, in such embodiments the shell section manufacturing station will be modified to provide larger external grooves 58 along the sparcap regions 100, and the feeders 74 on the creel 72 associated with these external grooves 58 will be pre-loaded with a larger carbon fiber roving. It will be understood that different arrangements of the density per area of the strengthening elements 62 in the final wind turbine blade 22 may be modified in other embodiments to meet the design parameters and needs of the end user, without departing from the scope of this invention.

The wind turbine blade 22 assembled by the automated manufacturing system 24 and methods of this invention address many of the shortcomings in the current process for wind turbine construction. To this end, the blade is manufactured with little to no human intervention and action required. As such, high costs associated with human labor are avoided. The blade manufacture process and apparatus described and defined herein allows a blade manufacture along the lines of an assembly process for pre-manufactured elements. Pre-manufactured sub-elements of a blade may easily be transported to the blade assembly site for final manufacture. The blade 22 may thereby advantageously be manufactured and finalized without necessitating long-distance transport of the finished item, which, in the context of public transportation infrastructure such as railways and roads is generally considered oversized, difficult and costly to transport. The manufacturing process and system described and defined herein may allow a blade 22 to be assembled or finalized proximate to a site of installation for the wind turbine 10, which can be remote and hard to access via normal transportation channels, especially in the ever-expanding footprint of wind energy production around the world. Furthermore, the local manufacturing system 24 and methods improve the efficiency of wind turbine construction while remaining adaptable for future changes in blade design. A blade manufacturing system 24 as mentioned herein may designate a small-scale manufacturing site. A local blade manufacturing system 24 as mentioned herein may in particular designate a small-scale manufacturing site. Such a local manufacturing system 24 may advantageously, optionally be located proximate to a wind turbine construction site. The term proximate may advantageously include a designation of a distance which does not require passage on public roads. The term proximate may advantageously designate a distance which does not require passage on public railway networks, public, and/or private and/or otherwise. The term proximate may advantageously designate a distance which does not require passage over public infrastructure networks. Preferably, a proximal location may advantageously be one which includes transportation only over a short distance, optionally outside of public roads. By way of example, a proximate location may advantageously lie within 100 km (62-miles) of a wind turbine site. By way of example, a proximate location may advantageously lie within 70 km (43.5 miles) of a wind turbine site. By way of example, a proximate location may advantageously lie within 50 km (31 miles) of a wind turbine site.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination, including with any type of single rotor or multi rotor wind turbine. Additional advantages and modifications will readily appear to those skilled in the art. The invention in its broader aspects is therefore not limited to the specific details and illustrative examples shown and described. Accordingly, departures may be made from such details without departing from the scope of the invention as defined in the claims.

What is claimed is:

1. A method for manufacturing a wind turbine blade, the method comprising:
   connecting a plurality of shell core sections together in an abutting end-to-end arrangement, wherein each of the shell core sections is configured to define a portion of a span length of the wind turbine blade, and wherein each of the shell core sections defines a sidewall with an external surface and a plurality of external grooves recessed into the external surface including into portions of the external surface away from a sparcap region;
   applying a plurality of strengthening elements within the external grooves and extending the plurality of strengthening elements along the span length of the blade;
   depositing an outer surface material layer in fluid form to cover the external surface and the plurality of strengthening elements such that the outer surface material layer defines an external profile of the blade; and
   curing the shell core sections, the plurality of strengthening elements, and the outer surface material layer to produce a final consolidated part defining the blade.

2. The method of claim 1, further comprising:
   applying tension to the plurality of strengthening elements positioned within the plurality of external grooves and maintaining the tension through the steps of depositing the outer surface material layer and curing.

3. The method of claim 1, wherein the step of applying the plurality of strengthening elements further comprises:
   applying a differing density per area of the strengthening elements on different portions of the external surface of the shell core sections.

4. The method of claim 3, wherein the blade includes a web extending within a tubular structure defined by the sidewall of the plurality of shell core sections and the web extending along the span length to reinforce the blade, and the step of applying the plurality of strengthening elements further comprises:

applying a higher density per area of the strengthening elements in sparcap regions located adjacent to junctions of the web and the shell core sections than of other strengthening elements located at other portions of the plurality of shell core sections.

5. The method of claim 1, further comprising:
manufacturing the plurality of shell core sections from raw material prior to connecting the plurality of shell core sections together.

6. The method of claim 5, wherein manufacturing the plurality of shell core sections further comprises:
moulding the plurality of shell core sections in at least one mould in a shape of corresponding wind turbine blade sections such that the plurality of shell core sections include the plurality of external grooves on the external surface thereof.

7. The method of claim 5, wherein manufacturing the plurality of shell core sections further comprises:
forming the plurality of shell core sections by additive manufacturing to have a shape of corresponding wind turbine blade sections such that the plurality of shell core sections include the plurality of external grooves on the external surface thereof.

8. The method of claim 1, further comprising:
positioning a web within a tubular structure defined by the sidewall of the plurality of shell core sections and along the span length to reinforce the blade; and
positioning at least one web flange to extend within the tubular structure of the plurality of shell core sections and between the web and the plurality of shell core sections to strengthen the blade at junctions of the web and the plurality of shell core sections,
wherein the web and the at least one web flange are formed from different material than the plurality of shell core sections.

9. The method of claim 1, further comprising:
supplying the plurality of shell core sections to a creel of feeders configured to apply said plurality of strengthening elements onto said plurality of shell core sections.

10. The method of claim 1, further comprising forming the outer surface material layer by additive manufacturing.

11. The method of claim 1, further comprising:
manufacturing the wind turbine blade proximate to a site of installation for a wind turbine using the blade, wherein the steps of connecting the plurality of shell core sections together, applying the plurality of strengthening elements, depositing the outer surface material layer, and curing are each performed proximate to the site of installation for the wind turbine.

12. The method of claim 11, further comprising:
manufacturing the plurality of shell core sections at a manufacturing station proximate to the site of installation for the wind turbine prior to connecting the plurality of shell core sections together.

13. The method of claim 11, further comprising:
manufacturing the plurality of shell core sections from raw material at a second separate site, and transporting said plurality of shell core sections to said site proximate to the site of installation for the wind turbine prior to connecting the plurality of shell core sections together.

* * * * *